(12) United States Patent
Challa et al.

(10) Patent No.: US 9,600,430 B2
(45) Date of Patent: Mar. 21, 2017

(54) MANAGING DATA PATHS BETWEEN COMPUTER APPLICATIONS AND DATA STORAGE DEVICES

(71) Applicant: Hewlett-Packard Development Company, L.P., Houston, TX (US)

(72) Inventors: Narsimha Reddy Challa, Hyderabad (IN); Mohammed Sakhavullah, Hyderabad (IN); Vamsi Penumatsa, Hyderabad (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/690,682

(22) Filed: Apr. 20, 2015

(65) Prior Publication Data

US 2015/0227483 A1      Aug. 13, 2015

Related U.S. Application Data

(63) Continuation of application No. 13/436,169, filed on Mar. 30, 2012, now Pat. No. 9,015,372.

(51) Int. Cl.
*G06F 3/00* (2006.01)
*G06F 13/38* (2006.01)
*G06F 13/14* (2006.01)
*G06F 13/42* (2006.01)

(52) U.S. Cl.
CPC ............ *G06F 13/387* (2013.01); *G06F 13/14* (2013.01); *G06F 13/4221* (2013.01)

(58) Field of Classification Search
None
See application file for complete search history.

(56) References Cited

U.S. PATENT DOCUMENTS

2008/0250178 A1*  10/2008 Haustein ............... H04L 47/10
                                                            710/107
2012/0096059 A1*  4/2012 Shimizu ................ G06F 3/061
                                                            707/828

* cited by examiner

*Primary Examiner* — Henry Tsai
*Assistant Examiner* — Juanito Borromeo
(74) *Attorney, Agent, or Firm* — Hewlett Packard Enterprise Development Patent Department

(57) ABSTRACT

Provided is a computer-implemented method of managing data paths between a computer application and a storage device. The I/O (input/output) load data of a computer application is obtained. If the I/O load data of the computer application is above a pre-determined threshold, data paths are provisioned between the computer application and the storage device based on a pre-defined policy applicable to the computer application.

13 Claims, 4 Drawing Sheets

| Sl. No. | Application | Department | Application Criticality | Critical I/O Limit | Number of Possible Paths | Active Paths in Zoning | Storage Array | Storage Tier |
|---|---|---|---|---|---|---|---|---|
| 1 | A | Finance | 1 – Very Critical | 25000 I/Os per second | 6 | 2 | SA1, SA2, SA3 | Tier 1 – Hi Cost Storage |
| 2 | B | Global | 1 – Very Critical | 30000 I/O per second | 8 | 2 | SA1, SA2, SA3 | Tier 1 – Hi Cost |
| 3 | C | HR | 2 – Moderately Critical | 50000 I/O per second | 4 | 2 | SA1, SA2, SA3 | Tier 2 – Medium Cost |
| 4 | D | Client 1 | 3 – Less Critical | 80000 I/O per second | 1 | 1 | SA1, SA2, SA3 | Tier 3 – Low Cost |
| 5 | E | Client 2 | 3 – Less Critical | 90000 I/O per second | 1 | 1 | SA1, SA2, SA3 | Tier 3 – Low Cost |

FIG. 4

MANAGING DATA PATHS BETWEEN COMPUTER APPLICATIONS AND DATA STORAGE DEVICES

CLAIM FOR PRIORITY

The present application is a continuation application of application Ser. No. 13/436,169, filed on Mar. 30, 2012, which claims priority under 35 U.S.C 119 (a)-(d) to Indian patent application number 139/CHE/2012, filed on Jan. 12, 2012, the entirety of which are hereby incorporated. by reference for all purposes.

BACKGROUND

A typical large data center may include multiple computer systems connected to various data storage devices over a storage area network (SAN). These computer systems may host various computer applications which may depend on the data storage devices for their data storage requirements. Since the number of data storage devices in a data center may be limited due to, for instance, cost and space constraints, availability of storage is a critical resource for these computer applications. Under normal scenario, when the numbers of user requests are regular, a computer application may be able to handle such requests without any problem. However, in some situations, for instance, during the time of a festival, such as Christmas, when there may be a large number of user requests, an application may not be able to respond to such requests since the underlying data paths (storage paths) between the computer application and the data storage devices may not be available. This may lead to application downtime which is not desirable from an organization's point of view.

BRIEF DESCRIPTION OF THE DRAWINGS

For a better understanding of the solution, embodiments will now be described, purely by way of example, with reference to the accompanying drawings, in which:

FIG. 4 illustrates a table containing a few sample policies, according to an embodiment.

DETAILED DESCRIPTION OF THE INVENTION

As mentioned above, there may be situations when a computer application is unable to process a user request since there are no data paths (storage paths) available between the computer application and a data storage device(s), which stores the data that the computer application needs. This could be for a number of reasons. First, there may just be a single-path data path between the computer application and a data storage device i.e. there are no multi-path data paths. Second, multi-path data paths, although available, are not properly configured. As a result, the computer application is unable to process multiple user requests even if the data storage device(s) is capable of handling a large number of input/output (I/O) requests. This may lead to application downtime or failure.

In order to avoid such situations, proposed is a solution which may automatically assign additional storage paths between a computer application and a data storage device based on a pre-defined policy. Embodiments of the present solution provide a method and system for managing storage paths between computer applications and data storage devices (for example, in a data center environment).

For the sake of clarity, the term "data storage device" refers to a device capable of storing electronic or digital data. Some non-limiting examples include disks, tape drives and disk arrays.

Also, the term "data path" may include a physical and/or logical data path between two devices. The term "data path" is interchangeably used with "storage path" or "a logical unit number (LUN) path"

Figure 1:
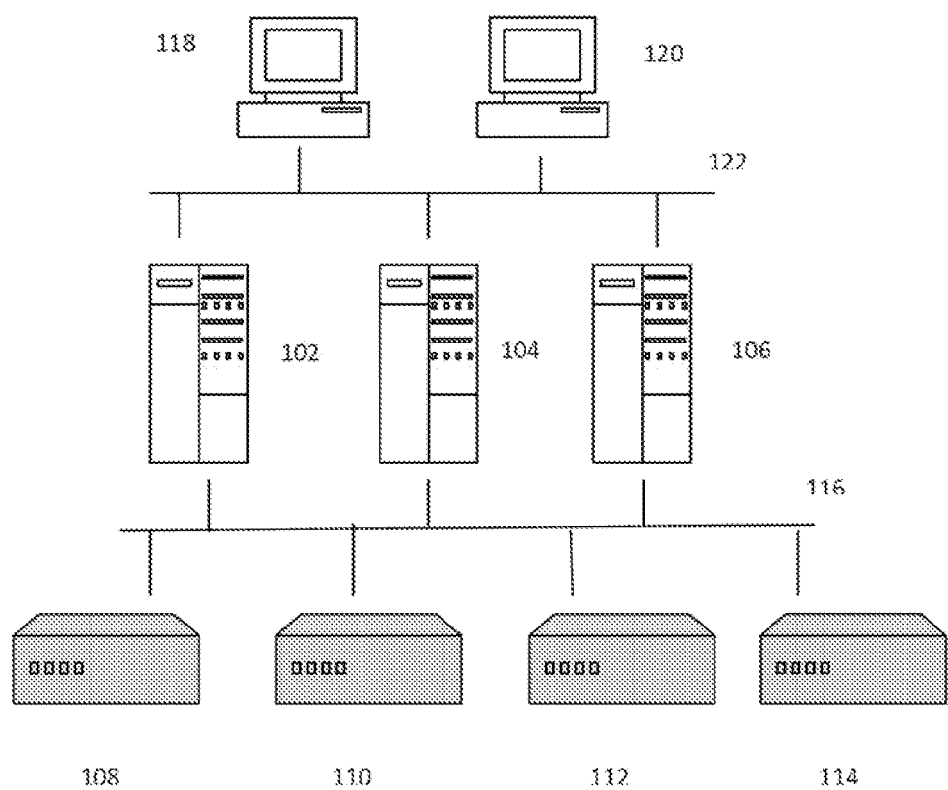
FIG. 1 illustrates a computer storage system, according to an embodiment.

FIG. 1 illustrates a computer storage system 100, according to an embodiment. The computer storage system includes host computer systems 102, 104, 106 coupled to data storage devices 108, 110, 112, 114 through a storage area network (SAN) 116. In one example, client computer systems 118, 120 are connected to host computers 102, 104, 106 through a computer network 122, such as an Ethernet local area network (LAN), a wide area network (WAN), the internet, and the like, through wired (for example, co-axial cable) or wireless (for example, Wi-Fi) means.

The host computer system 102, 104, 106 is a typical computing device, such as, but not limited to, a computer server, a desktop computer, a notebook computer and a personal computer (PC). A plurality of computer applications may be present on host computers 102, 104, 106. In one example, a computer application may be present on multiple host computers 102, 104, 106 each running a separate component.

The client computer systems 118, 120 are typically used to provide user requests to computer applications present on host computers 102, 104, 106 through the computer network 122.

The data storage device 108, 110, 112, 114 is a computing device capable of electronic or digital data storage, such as, but not limited to, tape drives, disk drives, disk array, optical discs (such as, CD, DVD and Blu-ray disc) and redundant array of independent disks (RAID).

The storage area network (SAN) 116 is a computer network that provides the host computers 102, 104, 106 access to the data storage device 108, 110, 112, 114. In an example, the storage area network (SAN) 116 provides single-path data path or multi-path data paths between host computers 102, 104, 106 and data storage devices 108, 110, 112, 114 (illustrated in FIG. 2). The storage area network (SAN) 116 may use the Small Computer System Interface (SCSI) protocol and Fibre Channel fabric topology for communication between host computers 102, 104, 106 and data storage devices 108, 110, 112, 114.

Although three host computers 102, 104, 106 are illustrated in FIG. 1, the storage system 100 may include any number of host computers. Likewise, although only four storage devices 108, 110, 112, 114 are illustrated, the storage system 100 may include any number of storage devices.

Figure 2:
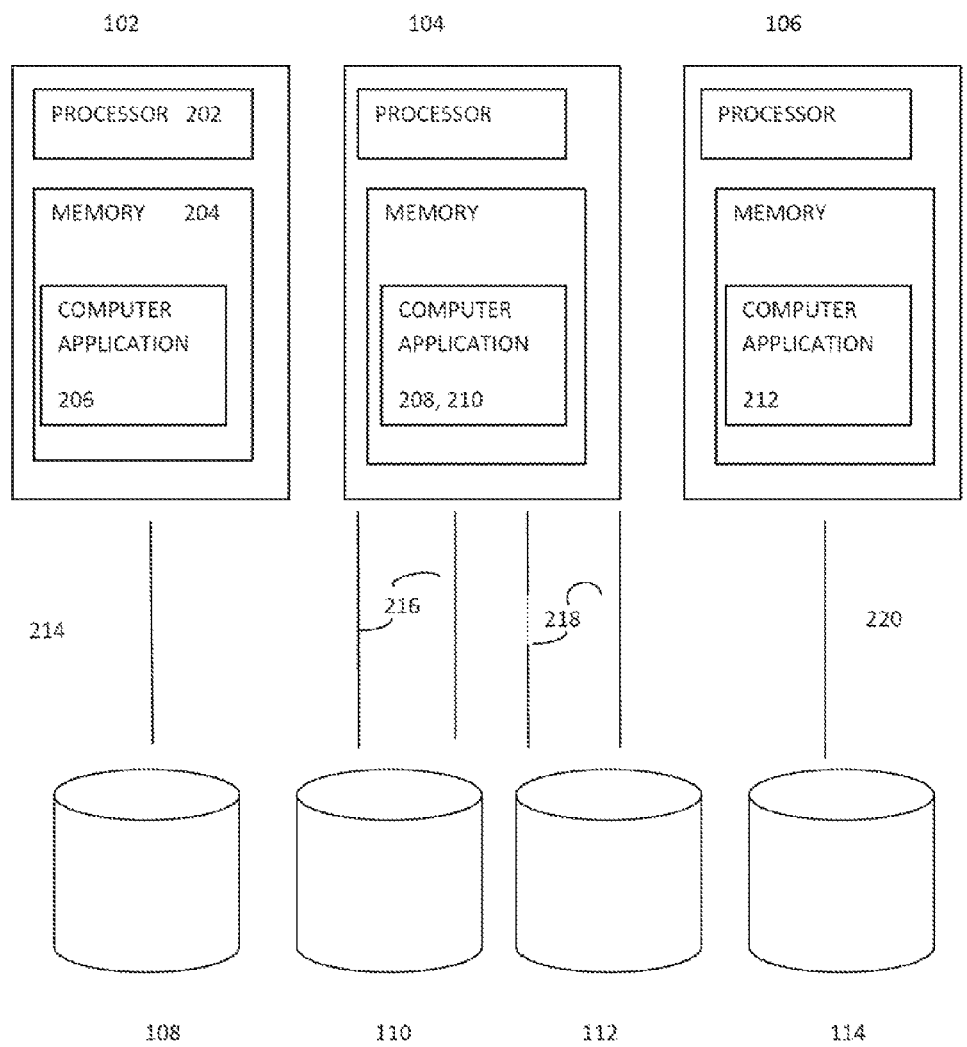
FIG. 2 illustrates a computer storage system showing data paths between host systems and storage devices, according to an embodiment.

FIG. 2 illustrates a computer storage system showing data paths between host systems and storage devices, according to an embodiment.

As mentioned earlier, a host computer system 102, 104, 106 is a typical computing device, such as, but not limited to, a computer server, a desktop computer, a notebook computer and a personal computer (PC). A typical host computer 102, 104 or 106 may include a processor 202, for executing machine readable instructions, and a memory (storage medium) 204, for storing machine readable instructions (such as, a computer application). The host computer system 102, 104, 106 may also include a network interface for connecting to a computer network, such as, but not limited to a local area network (LAN) and/or the internet.

Processor 202 is arranged to execute machine readable (or executable) instructions. The machine readable instructions may be in the form of computer applications 206, 208, 210, 212. In an example, the processor executes machine readable instructions, stored in memory 220, to: obtain I/O (input/output) load data of the computer application; if the I/O load data of the computer application is above a pre-determined threshold, provision data paths between the computer application and the storage device based on a pre-defined policy applicable to the computer application.

The memory 204 may include computer system memory such as, but not limited to, SDRAM (Synchronous DRAM), DDR (Double Data Rate SDRAM), Rambus DRAM (RDRAM), Rambus RAM, etc, or storage memory media, such as, a floppy disk, a hard disk, a CD-ROM, a DVD, a pen drive, etc. The memory of host computer systems 102, 104, 106 may store a plurality of computer applications, such as, but not limited to, computer applications 206, 208, 210, 212. In the illustration, computer application 206 resides in the memory 204 of the host computer system 102. Computer applications 208 and 210 are hosted by the host computer system 104, and computer application 212 resides in the memory of the host computer system 106. In one example, a computer application may be present on multiple host computers 102, 104, 106 each running a separate component.

The memory may also include a database. The pre-determined value of a computer application is defined in advance and stored in the database. In case there is a plurality of computer applications, pre-determined value of all computer applications is defined and stored in the database. In an example, memory 204 includes machine readable instructions to: obtain I/O (input/output) load data of the computer application; if the I/O load data of the computer application is above a pre-determined threshold, provision data paths between the computer application and the storage device based on a pre-defined policy applicable to the computer application.

The host computers 102, 104, 106 are coupled to data storage devices 108, 110, 112, 114 through data paths 214, 216, 218 and 220. Specifically, host computer 102 is connected to the data storage device 108 through a single-path data path 214. Host computer 104 is connected to the data storage devices 110 and 112 through multi-path data paths 216 and 218 respectively. And host computer 106 is connected to the data storage device 114 through a multi-path data path 220.

Data paths 214, 216, 218 and 220 may be physical (for instance, a cable) or logical data paths. They are meant to exchange data and/or signals between host computers 102, 104, 106 and data storage devices 108, 110, 112, 114. In an example, the data paths may be used to send storage data from a host computer 102, 104, 106 to a data storage device 108, 110, 112, 114. In another instance, the data paths may be used to receive storage data from a data storage device 108, 110, 112, 114 to a host computer 102, 104, 106.

It would be appreciated that the system components depicted in FIG. 2 are for the purpose of illustration only and the actual components may vary depending on the computing system and architecture deployed for implementation of the present solution. The various components described above may be hosted on a single computing system or multiple computer systems, including servers, connected together through suitable means.

It is clarified that the term "module", as used in this document, may mean to include a software component, a hardware component or a combination thereof. A module may include, by way of example, components, such as software components, processes, functions, attributes, procedures, drivers, firmware, data, databases, and data structures. The module may reside on a volatile or non-volatile storage medium and configured to interact with a processor of a computer system.

Figure 3:
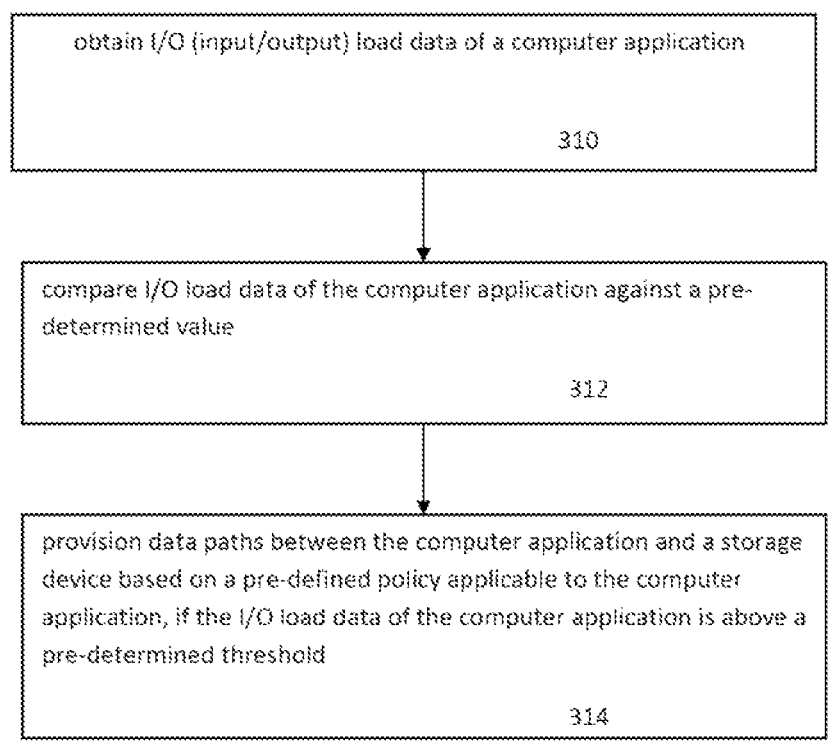
FIG. 3 illustrates a flow chart of a method of managing data paths between computer applications and data storage devices, according to an embodiment.

FIG. 3 illustrates a flow chart of a method of managing data paths between computer applications and data storage devices, according to an embodiment.

The method may be implemented in a system which may be a computing device, such as, but not limited to, a desktop computer, a notebook computer or a server computer. In one example, the method may be implemented in a computer storage system, such as the one illustrated in FIG. 1. Additionally, the method may be implemented in the form of a computer application (machine readable instructions which are executable by a processor) or module. In one example, the method may be implemented as part of a Storage Resource Management (SRM) application or as a separate module. The module could be coupled to a SRM application.

In one example, as a precursor to implementation along with a SRM application, the method may assume certain capabilities from the SRM application. Some of these may include: (a) the SRM application is capable of discovering hosts and their storage details like LUNs, data storage devices from which the LUNs were assigned, connectivity details like fabrics, switches and their ports etc. from a storage area network (SAN); (b) the SRM application is capable of discovering applications (file systems, databases etc.) and the LUNs assigned to them from SAN, discovering used space and I/O load etc. using application discovery agents; (c) the SRM application is capable of having application programming interfaces (APIs) to provision additional storage paths from various storage arrays. Further, the host system on which an application may run has a multiport host bus adaptor (HBA) and each port is connected to the fabric(s) to which the storage system is connected. Furthermore, the SRM application is capable of discovering data for each managed element, at configurable intervals, and storing it in a database. It provides the API layer using which users can retrieve details regarding managed resources. For example, for each managed entity, such as a computer application, the API may report the amount of storage allocated, used space and I/O load etc.

It should be noted that the above mentioned requirements are not compulsory and, in one instance, none of them may be required to implement the proposed method. In another instance, the above mentioned requirements may be non-limiting and additional or different functionalities may be needed.

At block 310, the input/output (I/O) load data (input/output requests) of a computer application is obtained. In case there is a plurality of computer applications, the input/output (I/O) load data of all computer applications may be obtained. In an instance, a user may specify the computer applications for which the input/output (I/O) load data needs to be obtained. The computer application or the plurality of computer applications may be present on a host computer or a plurality of host computers, which may be part of a data storage system (such as the one illustrated in FIG. 2). The data storage system could be a data center.

In one example, a SRM application or a module, which may be coupled to the SRM application, may be used to obtain the input/output (I/O) load data of a computer application or a plurality of computer applications, in addition to obtaining the input/output (I/O) load data of computer applications, the module may capture additional information details (or events) with regards to these computer applications. For example, apart from obtaining information related to I/O load factor of computer applications, it may also capture application details (type, critical or non-critical, subject to SLA, etc.), LUN information, etc.

In one example, a policy manager module may monitor the I/O loads of the computer application in a storage system.

At block 312, once the input/output (I/O) load data of a computer application is obtained, the I/O load data information of a computer application is compared against a pre-determined value (a pre-defined threshold). In case there is a plurality of computer applications, the I/O load data information of each computer application is compared against its respective pre-determined value. In another instance, a user may specify the computer applications whose I/O load data would be compared against their respective pre-defined thresholds. The pre-determined value of a computer application is defined in advance and stored in a database. In case there is a plurality of computer applications, pre-determined value of all computer applications is defined and stored in the database.

A user (for instance, an administrator) may specify or configure the threshold value or percentage of I/O load that must not be exceeded at any point of time for a computer application's LUN. This value could be different for different applications based on the application type, application requirements and also based on organizational policies. This value could also be provided as an input by the administrator while discovering the application.

At block 314, if the I/O load data of the computer application is above a pre-determined threshold, data paths are provisioned between the computer application and a storage device based on a pre-defined policy applicable to the computer application.

From the I/O load obtained at block 310 and compared against a threshold at block 312, the method determines if the I/O load data of the computer application is above a pre-determined threshold. If the I/O load data is above the application's pre-determined threshold, it is imputed that there is a bottleneck between the computer application and a storage device coupled to the computer application. To overcome this bottleneck, the method provisions data paths between the computer application and a storage device. The provisioning is not done arbitrarily, but is rather based on a policy which is pre-defined for the computer application.

In case there's a plurality of computer applications, and the I/O data load for a plurality of computer applications exceed their respective pre-determined threshold, then the method provisions data paths for each of the plurality of computer application (which are exceeding their respective pre-determined threshold) to a storage device (or multiple storage devices). The provisioning is based on the policy applicable to the computer application.

The provisioning policy applicable to a computer application, which may be termed as Storage Path Provisioning Policy, could be system defined or user defined (for instance, an administrator). There may be separate provisioning policies for all computer application or a group of computer applications may be governed by a single policy. In one instance, a provisioning policy could be assigned to a specific application amongst a group of applications. The assignment of a provisioning policy to a computer application or a group of applications may depend upon a factor(s) or requirement(s). Some of the non-limiting requirements may include service level agreement (SLA) conditions, organization policies, customer specific policy, etc.

The provisioning policy specifies the manner of provisioning storage paths when a computer application (or a plurality of computer applications, if they are governed by the same policy) exceeds the pre-defined I/O load limit. Therefore, if a computer application reaches the critical I/O limit mentioned specified earlier, a policy manager will implement the provisioning policy action.

To provide an illustration (with reference to FIG. 4), let's assume that there are five computer applications (A, B, C, D, and E) on the host computer devices in a data storage system, which has three storage devices (SA1, SA2 and SA3). A user (for example, an administrator) may classify these applications on the basis of certain factor(s). Some of the non-limiting factor may include service level agreement (SLA) requirement, organization policies, customer specific policy, etc. In one example, the applications may be classified based on their importance or critical factor. The classification used could be 1) Very critical, 2) Moderately critical and 3) Less critical. Computer applications A and B may be classified as Very critical, computer application C may be classified as Moderately critical and computer applications D and E may be classified as Less critical. The storage devices (SA1, SA2 and SA3) may also be grouped into three tiers based on their cost. Tier1 is High Cost Storage, Tier2 is Medium Cost Storage and Tier3 is Low Cost Storage. Each row in the table represents the policy for a specific application.

The policies are created in such a way that all the applications with Very critical classification are allocated additional storage paths on a high priority basis, followed by applications which are Moderately critical. Lastly, Less critical applications are considered. In another case, the policy may specific that a relatively higher cost storage (for example, a High Cost Storage against a Medium Cost Storage) may be allocated to a more critical application (for example, to a Very critical application against a Moderately critical application.

In use, a policy manager module monitors the I/O loads of the computer applications (A, B, C, D, and E) in the storage system. Next, the I/O load data of computer applications is compared against their respective pre-determined values. If any of the computer application exceeds its pre-determined value, the policy manager looks at the classification category assigned to the computer application (for example, 1) Very critical, 2) Moderately critical and 3) Less critical). Based on the classification, the applicable provisioning policy is applied to the computer application. Let's assume that applications A and C are exceeding their I/O load. Since application A is more critical (Very critical) than application C (Moderately critical), it may be taken up first for provisioning. Further, since application A is more critical, a High Cost Storage may be allocated to it in preference to application C. In other words, policy parameters applicable to a computer application (in this case, for application A: Very critical and High Cost Storage) are considered before storage provisioning is carried out. If the critical I/O load limit for any of the application's LUN reaches the threshold value mentioned, a policy manager will automatically provision additional storage paths between application's LUNs and corresponding storage devices.

Now, the provisioning of data paths between a computer application and a storage device may take place as follows.

In one example, the existing data paths between a computer application and a storage device are checked. If there are existing multi-path data paths between the computer application and the storage device which are improperly configured to take care of application's I/O data load, the existing multi-path data paths are reconfigured to manage the application's I/O data load. This may be done as follows. To begin with, a check is done on the LUNs utilized by a computer application to determine if any of them are exceeding their pre-defined threshold I/O loads. If the I/O load exceeds for a LUN exceeds its pre-defined I/O level, all possible data paths between the host computer and the storage device are checked to determine if all of them are active.

If the number of possible paths is equal to the number of active paths, those storage ports are identified, from a storage port list, which are part of the active paths for the relatively more critical application. Now each storage port in the storage port list is checked to determine if it is part of a non-critical application LUNs and if the application's LUNs have more than two paths for this LUN. If yes, this zone is made inactive so that the I/O load can be reduced.

If the number of possible paths is unequal to the number of active paths, those storage ports are identified, from the storage port list, which are not part of an active zone. From the identified storage ports, an optimal storage port is selected which has less number of active paths and low I/O load. The selected zone is provisioned and added to active zone set of the computer application.

Provided below is an example pseudocode for load balancing existing data paths between a computer application and a storage device.

```
IF External PATH I/O rate exceeds
USER_GIVEN_THRESHOLD_VALUE
{
    Check for Total Possible Paths Available from HOST to Storage Ports.
    IF No. of Possible PATHS for LUNS Equal to Number of Active Paths all the paths
    {
        StoragePortsList = Retrieve storage ports which are part of Active Paths for the more critical application.
        For each such storagePort in storagePortList:
            Check it is part of Non critical application Luns:
            Check if the applications Luns are having more than 2 paths for this Lun
                Make this zone as Inactive so that the I/O load can be reduced with out compromising the SLA for the less critical applications.
    }
    ELSE
        Check the storagePorts which are not part of Active Zones:
        Choose the (best optimal) storage port on which less number of active paths and less I/O load
            Provision zone and add the zones to the Active Zone Set.
}
```

In another example, if the existing multi-path data paths between the computer application and the storage device are properly configured, additional data paths are configured between the computer application and the storage device to manage the application's I/O data load. This may be done as follows. The number of data paths between the computer application and the storage device is identified along with all HBA ports for the host computer(s) and all storage ports. Then all storage ports and HBA ports that have common fabric are determined. For example, let's say there are two HBA ports (H1 and H2) and three storage ports (SP1, SP2 and SP3) with two common fabrics (F1 and F2). Then all possible paths between host HBA ports and storage ports are determined. H1->F1->SP1 would represent a connection between host port H1 and storage port SP1 through fabric F1. Another connection say H2->F2->(SP2, SP3) would represent a path from host's HBA Port H2 to storage Ports SP2 and SP3 through Fabric F2.

Next, the policy applicable to the computer application is identified and action parameters associated with the policy are obtained. Now, for a LUN of the computer application, the following actions are taken.

a) Determine the storage volume and all existing data paths between application's host computer and the storage device.

b) For each data path, determine host HBA port, storage device port and add them to used port sets.

c) Export the storage volume through a new storage port which is not in any existing paths (i.e. not in the above used set) and which has connectivity to the common fabrics. This will create a new Storage Protocol Controller.

d) Assign access to the storage volume through the new HBA port (not in above used set) by assigning it to the Storage Protocol Controller above.

e) Create a zoning configuration to include the new storage ports and HBA ports, if they are not in a zone.

f) Activate the new zone configurations, which will create a new data path from the storage LUN to the host computer.

As mentioned earlier, in case there's a plurality of computer applications, and the I/O data load for a plurality of computer applications exceed their respective pre-determined threshold, then the method provisions data paths for each of the plurality of computer application (which are exceeding their respective pre-determined threshold) to a storage device (or multiple storage devices). The provisioning is based on the policy applicable to the computer application(s).

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A computer-implemented method of allocating an additional data path between a computer application and a storage device comprising:
   identifying host bus adaptor (HBA) ports of a host computer hosting the computer application and storage ports of the storage device;
   determining a storage volume in the storage device that is used by the computer application and existing data paths between the computer application and the storage device;
   identifying used port sets including the HBA ports and storage ports used by the existing data paths;
   transferring the storage volume to a storage port which is not in the used port sets;
   assigning access to the storage volume through an HBA port which is not in the used port sets; and
   creating a new data path, based on a pre-defined policy, between the computer application and the storage device through the storage port and the HBA port not in the used port sets, wherein the pre-defined policy comprises a classification of the computer application and the classification is selected from a plurality of tiered factors.

2. The method of claim 1, wherein creating the new data path comprises:
   creating a zoning configuration, if the storage port and the HBA port not in the used port sets are not in a zone; and
   activating the zoning configuration to create the new data path.

3. The method of claim 2, wherein the pre-defined policy comprises information corresponding to a service level agreement associated with the computer application.

4. The method of claim 2, wherein the pre-defined policy comprises a classification of the storage device.

5. The method of claim 2, wherein the pre-defined policy is applicable to other computer applications.

6. A system for managing data paths between a computer application and a storage device, comprising:
   a processor; and
   a memory coupled to the processor and comprising machine executable instructions, that when executed by the processor, cause the processor to:
   identify host bus adaptor (HBA) ports of a host computer hosting the computer application and storage ports of the storage device;
   determine a storage volume in the storage device that is used by the computer application and existing data paths between the computer application and the storage device;
   identify used port sets including the HBA ports and storage ports used by the existing data paths;
   transfer the storage volume to a storage port which is not in the used port sets;
   assign access to the storage volume through an HBA port which is not in the used port sets; and
   create a new data path, based on a pre-defined policy, between the computer application and the storage device through the storage port and the HBA port not in the used port sets, wherein the pre-defined policy comprises a classification of the computer application and the classification is selected from a plurality of tiered factors.

7. The system of claim 6, wherein the computer application is present in a host computer in a plurality of host computers of a computer storage system.

8. The system of claim 7, wherein the computer storage system comprises the plurality of host computers associated with a plurality of corresponding classifications and a plurality of storage devices associated with a plurality of corresponding tiers.

9. The system of claim 8, wherein creation of the new data path is based on the plurality of corresponding classifications or the plurality of corresponding tiers.

10. The system of claim 6, wherein the machine executable instructions further cause the processor to:
    if existing multi-path data paths between the computer application and the storage device are determined to be improperly configured to manage an input/output data load of the computer application, then, to create the new data path, reconfigure at least one of the existing multi-path data paths to manage the I/O data load; and
    if the existing multi-path data paths between the computer application and the storage device are determined to be properly configured to service the I/O data load of the computer application, then add a new data path between the computer application and the storage device.

11. A non-transitory computer readable storage medium comprising computer executable code, that when executed by a processor, cause the processor to:
    for a computer application having an input/output load above a pre-determined threshold, configure existing data paths between the computer application and a storage device, wherein the existing data paths include used port sets including host bus adaptor (HBA) ports of a host computer hosting the computer application and storage ports of the storage device, and wherein to configure the existing data paths comprises:
    determine if all existing data paths in multi-path data paths are active;
    if all existing data paths in the multi-path data paths are active, then identify storage ports on the storage device that are part of the active data paths, then determine if an identified storage port is associated with a non-critical computer application, and
    inactivate a zone between the identified storage port and the non-critical computer application; and if all existing data paths in the multi-path data paths are not active, then activate an inactive data path, based on a pre-defined policy, between the computer application and the storage device, wherein the pre-defined policy comprises a classification of the computer application and the classification is selected from a plurality of tiered factors.

12. The non-transitory computer readable storage medium of claim 11, wherein to activate an inactive data path comprises:
    identify storage ports on the storage device which are not part of an active zone; and
    select a storage port, from the identified storage ports, which has a low I/O data load, wherein the activated data path uses the selected storage port.

13. The method of claim 1, wherein different ones of the plurality of levels are associated with an order associated with the transferring of the storage volume to the storage port which is not in the used port sets.

* * * * *